US012486201B2

(12) United States Patent
Rollmann et al.

(10) Patent No.: US 12,486,201 B2
(45) Date of Patent: Dec. 2, 2025

(54) DRY MATERIAL MIXTURE FOR A BACKFILL, PREFERABLY A REFRACTORY CONCRETE BACKFILL, FOR PRODUCING A HEAVY-CLAY REFRACTORY NON-BASIC PRODUCT, REFRACTORY CONCRETE BACKFILL AND SUCH A PRODUCT, METHOD FOR PRODUCING SAME, LINING, AND INDUSTRIAL FURNACE, CHANNEL TRANSPORT SYSTEM OR MOBILE TRANSPORT VESSEL

(71) Applicant: Refratechnik Holding GmbH, Munich (DE)

(72) Inventors: Steffen Rollmann, Plaidt (DE); Bertram Kesselheim, Bad Hönningen (DE); Jasper Neese, Göttingen (DE)

(73) Assignee: Refratechnik Holding GmbH, Munich (DE)

( * ) Notice: Subject to any disclaimer, the term of this patent is extended or adjusted under 35 U.S.C. 154(b) by 446 days.

(21) Appl. No.: 18/012,249

(22) PCT Filed: Jul. 1, 2021

(86) PCT No.: PCT/EP2021/068257
§ 371 (c)(1),
(2) Date: Dec. 22, 2022

(87) PCT Pub. No.: WO2022/003132
PCT Pub. Date: Jan. 6, 2022

(65) Prior Publication Data
US 2023/0312418 A1   Oct. 5, 2023

(30) Foreign Application Priority Data
Jul. 1, 2020   (DE) ............... 10 2020 208 242.1

(51) Int. Cl.
| | | |
|---|---|---|
| C04B 22/16 | (2006.01) | |
| C04B 14/30 | (2006.01) | |
| C04B 28/24 | (2006.01) | |
| C04B 40/00 | (2006.01) | |
| C04B 103/61 | (2006.01) | |
| C04B 111/00 | (2006.01) | |
| C04B 111/28 | (2006.01) | |
| F27D 1/00 | (2006.01) | |

(52) U.S. Cl.
CPC ............ C04B 22/16 (2013.01); C04B 14/303 (2013.01); C04B 28/24 (2013.01); C04B 40/0042 (2013.01); F27D 1/0006 (2013.01); *C04B 2103/61* (2013.01); *C04B 2111/00879* (2013.01); *C04B 2111/28* (2013.01)

(58) Field of Classification Search
CPC ....... C04B 22/16; C04B 14/303; C04B 28/24; C04B 40/0042; C04B 35/101; C04B 35/6316; C04B 35/632; C04B 35/6306; C04B 35/66; C04B 35/6309; C04B 2103/61; C04B 2111/00879; C04B 2111/28; C04B 2235/3208; C04B 2235/3215; C04B 2235/3418; C04B 2235/3222; C04B 2235/3463; C04B 2235/5436; C04B 2235/3212; C04B 2235/3217; C04B 2235/445; C04B 2235/447; C04B 2235/448; C04B 2235/5212; C04B 2235/542; C04B 2235/5463; C04B 2235/5472; C04B 2235/9669; C04B 2235/9676; F27D 1/0006
See application file for complete search history.

(56) References Cited

U.S. PATENT DOCUMENTS

| | | |
|---|---|---|
| 4,126,474 A | 11/1978 | Talley et al. |
| 5,190,899 A | 3/1993 | Sutor |
| 5,888,292 A | 3/1999 | Tremblay |
| 6,447,596 B1 | 9/2002 | Tremblay et al. |

FOREIGN PATENT DOCUMENTS

| | | |
|---|---|---|
| CN | 106915968 A | 7/2017 |
| CN | 109265182 A | 1/2019 |
| CN | 109400188 A | 3/2019 |
| DE | 2605906 A1 | 9/1976 |
| DE | 2835934 A1 | 3/1979 |
| DE | 102008003640 A1 | 7/2009 |
| EP | 2550243 A2 | 1/2013 |
| GB | 1435988 A | 5/1976 |

OTHER PUBLICATIONS

Translation of Written Opinion of PCT/EP2021/068257 (Year: 2023).*
European Patent Office, Rijswijk, Netherlands, International Search Report of International Application No. PCT/EP2021/068257, Mailed Oct. 28, 2021, 3 pages.
Adabifiroozjaei Esmaeil et al., "Effects of AlPO4 addition on the corrosion resistance of andalusite-based low-cement castables with molten A1-alloy" Journal of The European Ceramic Society., GB, vol. 33, No. 6, Jun. 1, 2013 (Jun. 1, 2013), pp. 1067-1075, DOI: 10.1016/j.jeurceramsoc.2012.11.005, ISSN: 0955-2219, XP055851851.
Esmaeil Adabifiroozjaei et al., "Effects of Different Calcium Compounds on the Corrosion Resistance of Andalusite-Based Low-Cement Castables in Contact with Molten A1-Alloy" Mettalurgical and Materials Transactions B, Springer-Verlag, New York, vol. 42, No. 2, Jan. 11, 2011 (Jan. 11, 2011), pp. 400-411, DOI: 10.1007/S11663-010-9468-Z, ISSN: 1543-1916, XP019889187.

* cited by examiner

*Primary Examiner* — Anthony J Green
(74) *Attorney, Agent, or Firm* — Dickinson Wright PLLC

(57) ABSTRACT

A dry substance mixture for a batch, preferably a refractory batch, for the production of a coarse ceramic, refractory, non-basic, shaped or unshaped product, such a refractory batch, such a product as well as a method for its production and a lining of an industrial furnace for the aluminum industry, and such an industrial furnace as well as a lining of a launder transport system or a mobile transport vessel for the aluminum industry, and such a launder transport system and such a transport vessel.

30 Claims, 4 Drawing Sheets

DRY MATERIAL MIXTURE FOR A BACKFILL, PREFERABLY A REFRACTORY CONCRETE BACKFILL, FOR PRODUCING A HEAVY-CLAY REFRACTORY NON-BASIC PRODUCT, REFRACTORY CONCRETE BACKFILL AND SUCH A PRODUCT, METHOD FOR PRODUCING SAME, LINING, AND INDUSTRIAL FURNACE, CHANNEL TRANSPORT SYSTEM OR MOBILE TRANSPORT VESSEL

CROSS REFERENCE TO RELATED APPLICATIONS

This application is a 35 U.S.C § 371 national phase application of International Application No. PCT/EP2021/068257, filed on Jul. 1, 2021, which claims the benefit of priority under 35 U.S.C. § 119 to German Patent Application No.: 10 2020 208 242.1, filed Jul. 1, 2020, the contents of which are incorporated herein by reference in their entirety.

FIELD

The present invention relates to a dry substance mixture for a batch, preferably a refractory concrete batch, for the production of a coarse ceramic, refractory, non-basic, shaped or unshaped product, such a refractory concrete batch, such a product as well as a method for its production and a lining of an industrial furnace for the aluminum industry, and such an industrial furnace. Further, the invention relates to a lining of a launder transport system or a mobile transport vessel for the aluminum industry, and to such a launder transport system and such a transport vessel. The aluminum industry includes both the primary aluminum producing industry as well as the aluminum processing industry and the secondary aluminum producing industry.

BACKGROUND

The statements in this section provide background information related to the present disclosure, definitions for terms used in the present disclosure, and other basic information regarding the present invention in order to provide a better understanding of the overall disclosure. In doing so, these statements may not constitute prior art.

In the context of the invention, the term "refractory" is not intended to be limited to the definition according to ISO 836 or DIN 51060, which define a pyrometric cone equivalent of >1500° C. Refractory products within the meaning of the invention have a compression softening point $T_{0.5}$ according to DIN EN ISO 1893: 2008-09 of $T_{0.5} \geq 600°$ C., preferably $T_{0.5} \geq 800°$ C. Accordingly, refractory or fire-resistant granular materials or grainings in the sense of the invention are those materials or grainings which are suitable for a refractory product with the above-mentioned compression softening point $T_{0.5}$.

The refractory products according to the present disclosure are used for the protection of aggregate constructions in aggregates in which temperatures between 60° and 2000° C., in particular between 80° and 1500° C., predominate.

Coarse ceramic products are known to be products manufactured from granular materials with grain sizes up to 6 mm, in special cases also up to 25 mm (see "Gerald Routschka/Hartmut Wuthnow, Praxishandbuch "Feuerfeste Werkstoffe", 6th edition, Vulkan-Verlag (hereinafter referred to simply as "Practical Manual"), chapter 2 for additional information).

Coarse ceramics are distinguished from fine ceramics by the grain size of the microstructure constituents. If the microstructure constituents are at least partially larger than 1 mm, the product is a coarse ceramic product, if the microstructural constituents are exclusively ≤1 mm, it is a fine ceramic.

In this context, the term "graining" or "granular material" within the meaning of the present disclosure includes a pourable solid material consisting of many small, solid grains. If the grains have a grain size ≤200 µm, the granular material is a meal or powder. If the grains are produced by mechanical comminution, e.g. crushing and/or grinding, it is a crushed granule or a crushed granular material. However, a granular material may also have granulate grains or pellet grains that are produced by granulating or pelletizing, respectively, without mechanical comminution. The grain size distribution of the granular material is usually adjusted by sieving.

Furthermore, unless otherwise indicated, the grain sizes specified within the scope of the present disclosure are determined in accordance with DIN 66165-2:2016-08.

Furthermore, unless otherwise indicated, the aggregate materials/granular materials used within the scope of the present disclosure are crushed granular materials.

In the context of the present disclosure, grain fractions or grain classes also each have grain sizes between the two specified test grain sizes. The designation grain fraction or grain class thus means that no grains remain on the upper sieve and none fall through the lower sieve. There is therefore no oversize grain and no undersize grain.

In contrast, the term "grain group" includes that some grains remain on the upper sieve (oversize grain) and some fall through the lower sieve (undersize grain).

In addition, grain fractions or grain groups used in the field have grains of different sizes. Thus, they have a grain distribution or grain size distribution. They are not single grain fractions or single grain groups.

Furthermore, refractory products may be divided into non-basic (see Practical Manual, 4.1 for additional information) and basic products (see Practical Manual, 4.2 for additional information). According to DIN EN ISO 10081: 2005-05, a distinction is made between non-basic and basic refractory products, based in particular on the chemical reaction behaviour. The product group of the non-basic products comprises the materials of the $SiO_2$—$Al_2O_3$ series and other materials that cannot be further classified according to their chemical reaction behaviour, such as SiC and carbon products. The essential characteristic of most basic products is that the sum of the oxides MgO and CaO predominates. In addition, chromite, picochromite, spinel and forsterite bricks are included among the basic products, although they are almost neutral.

In the case of coarse ceramic products, a distinction may also be made between shaped and unshaped products. Shaped coarse ceramic products are unfired, tempered or ceramically fired products, preferably manufactured in a ceramic factory, in particular bricks or plates. They have a defined geometry and are ready for installation. Shaping is carried out, for example, by pressing, stamping, ramming or slip casting. The shaped products, in particular the bricks, are walled with mortar or without mortar ("crunch"), e.g. to form a lining.

The production process of coarse ceramic molded products is usually divided into the following steps (see Practical Manual, page 14/point 2.1 for additional information):

preparation;
mixing;
shaping;
drying;
(if necessary) thermal treatment up to 800° C., firing or sintering; and
post-treatment (if necessary).

Unshaped products (see Practical Manual, page 142/point 5 for additional information) are products which, usually at the user's site, are formed into their final shape from an unshaped fresh mass or from lumps, e.g. by casting, vibrating, poking, stamping or gunning. Unshaped products are usually placed behind formwork in larger fields at the place of use and, after hardening, form part of the lining. For example, unshaped products are gunning masses, stamping masses, casting masses, vibrating masses or grouting masses.

According to DIN EN 1402-1:2004-01, unshaped refractory products are mixtures consisting of aggregate materials and one or more binders, prepared for direct use, either as supplied or after addition of one or more suitable liquids. They may contain metallic, organic or ceramic fibers. These mixtures are either dense or insulating. Insulating mixtures are those which have a total porosity of >45%, determined according to EN 1094/4 on a test specimen fired under specified conditions.

The types of binding of unshaped products may be distinguished between:
a) hydraulic binding with setting and hydraulic hardening at room temperature,
b) ceramic binding with hardening by sintering during firing,
c) chemical binding (inorganic or organic-inorganic) with hardening by chemical, but not hydraulic reaction at room temperature or at a temperature below the ceramic binding,
d) organic binding with setting or hardening at room temperature or at higher temperatures.

Mixed bindings frequently occur in practice.

The unshaped products may also be classified according to product types and processing methods.

Refractory concretes are probably the most important product group of unshaped products. Refractory concretes can be dense or insulating. Dense refractory concretes are classified according to DIN EN ISO 1927-1:2012-11.

Conventional refractory concretes (type RC=regular castable) are hydraulically hardening and cement-containing refractory concretes that do not yet have a plasticizer.

Liquefied refractory concretes must contain at least one plasticizer and at least 2 ma % ultrafine particles with a particle size <1 μm. The ultrafine particles are, for example, fumed silica or reactive alumina.

The liquefied refractory concretes may be further subdivided according to their CaO content of the mixture into:

|  | CaO-content [ma.-%] | |
| --- | --- | --- |
|  | min. | max. |
| Medium-cement refractory concrete (type MCC) | >2.5 | — |
| Low-cement refractory concrete (type LCC) | >1.0 | ≤2.5 |
| Ultra-low-cement refractory concrete (type ULCC) | >0.2 | ≤1.0 |
| Cement-free refractory concrete (type NCC) | 0 | ≤0.2 |

Chemically bonded refractory concretes are another type of product. They contain one or more chemical binders that harden as a result of a neutralization reaction after the addition of a suitable mixing liquid and intensive mixing. A clean distinction between a chemically bonded refractory concrete and a liquefied refractory concrete of the NCC type is often difficult. But in the case of NCC, the strength formation must be induced by hydrates, such as alumina hydrates, and not by soles or phosphates (see Practical Manual, page 145/last but one paragraph for additional information). However, mixed bindings are also possible.

Refractory concretes are also classified by type of chemical composition as follows (see Practical Manual, page 149/point 5.1.3 for additional information):

Alumina-Silica ($Al_2O_3$—$SiO_2$) products are refractory concretes whose aggregate materials consist essentially of aggregate materials of $Al_2O_3$ (aluminium oxide or alumina), $SiO_2$ and aluminosilicates.

In basic refractory concretes, the aggregate materials consist mainly of magnesia, dolomite, chromium magnesia, chromium ore and spinel.

In special refractory concretes, the aggregate materials consist essentially of raw materials other than those mentioned above, such as silica glass, silicon carbide, silicon nitride, zirconium silicate, and zirconium oxide.

Carbonaceous refractory concretes consist essentially of the above aggregate materials, but contain more than one percent carbon or graphite.

The shaped and unshaped products according to the present disclosure are preferably used in industrial firing or melting aggregates or in other fired industrial aggregates, e.g. in an industrial furnace to form a refractory lining (working casing or wear casing) of the same on the fire side or on the inner side of the aggregate. Preferably, they are used as working casing in furnaces of the aluminum industry, preferably in the secondary aluminum industry.

Moreover, the shaped and unshaped products according to the present disclosure can also be used as insulating backing, which is arranged directly following the working casing, in one of said furnaces.

In the production of aluminum in the primary aluminum industry, primary aluminum is produced by smelting electrolysis of minerals. Primary aluminum is usually produced by smelting electrolysis of aluminum ore, usually of bauxite. During ore processing, aluminum oxide (alumina) is enriched from the bauxite. Afterwards, the actual metal extraction takes place with the help of smelting flux electrolysis.

In order to lower the very high melting point of alumina of about 2050° C., cryolite ($Na_3AlF_6$) and other fluorine compounds such as aluminum fluoride ($AlF_3$) and calcium fluoride ($CaF_2$) are added in excess, so that the melting point of the mixture is lowered to about 950° C.

The primary aluminum melted in the smelting flux electrolysis process is then alloyed in various smelting furnaces and prepared for the various casting processes. And the products resulting from the smelting are further processed accordingly. Alloying, for example, is carried out in smelting furnaces or holding furnaces, in which a molten aluminum is mixed with the alloying agents. The melt bath temperatures are about 850° C. Such furnaces are often lined on the fire side with aluminosilicate refractory products.

Secondary aluminum production consists of recycling aluminum scrap or processing waste to obtain aluminum, referred to as "secondary" or "second fusion". In addition, aluminum alloys can also be obtained. This also requires different furnaces, including smelting furnaces, e.g. also recycling furnaces, casting furnaces and holding furnaces. The smelting furnaces are preferably (tilting) drum melting furnaces, shaft smelting furnaces, (channel) induction furnaces or two- and multi-chamber furnaces. Also required are road transport crucibles and foundry transport crucibles or other mobile transport vessels for liquid aluminum or liquid aluminum alloys, as well as launder transport systems (for this, in particular, prefabricated solutions). The stationary channel transport systems are also used to transport liquid aluminum or liquid aluminum alloys. These furnaces are furnaces of the secondary aluminum industry.

In general, the secondary aluminum industry is the aluminum processing industry and the aluminum recycling industry. Within the secondary aluminum industry, for example, aluminum alloys are produced.

As already explained, the products according to the present disclosure are preferably used in furnaces of the secondary aluminum industry. Preferably, they are used as working casing in the bath area, in the ramp and in the burner fields of these furnaces. The working casing is in direct contact with the liquid aluminum or liquid aluminum alloy. In particular, they are used as follows:

In smelting furnaces, e.g. recycling furnaces: as a working casing in the bath area, the ramp and the burner fields;
In casting furnaces: as working casing in the bath area, the ramp and the burner fields;
In launder systems: as working casing; and
In (transport) crucibles: as working casing.

One of the problems in the production and further processing of aluminum is that it has a strong affinity for oxygen, which can lead to different oxidation mechanisms of the refractory lining. An aluminum oxide skin (4Al(liquid)+ 3O$_2$→Al$_2$O$_3$) also forms on the bath surface, which is intentional because it protects against further oxidation. And in the contact area of the liquid aluminum to the refractory lining, the following reaction occurs, if the lining contains free SiO$_2$:

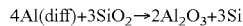

4Al(diff)+3SiO$_2$→2Al$_2$O$_3$+3Si

Such refractory products should therefore have high density and high infiltration resistance. They should also have sufficiently high strengths, high corrosion resistance and good thermal shock resistance.

In order to avoid structural destruction by contact corrosion, it is also common for the refractory products to have so-called "anti-wetting" additives or anti-wetting agents as corrosion inhibitors. These are, for example, BaSO$_4$ or fluorides, e.g. CaF$_2$ or AlF$_3$. The anti-wetting agents are added to prevent infiltration tendency. Their positive influence on corrosion resistance is partly or combinedly composed of three basic mechanisms. For example, there may be a change in volume due to mineral transformations and new phase formation due to reaction with the surrounding media and atmosphere. As a result, pores are closed by sintering. This thus reduces the open porosity.

In addition, a viscous melt can be formed by partial melting of the raw materials. This has a sticking or sealing effect and thus reduces the infiltration tendency. A kind of passivation or protective layer is thus formed.

The internal pore pressure can also be increased, which also reduces the infiltration tendency. The internal pore pressure is increased, for example, by the evaporation of phosphate compounds.

BaSO$_4$ and CaF$_2$ act reliably in the area of the lining below the melt bath surface, where temperatures usually predominate between, for example, 760 to 840° C. up to a maximum of 1050° C. Even above the melt bath surface, e.g. when the melt bath level drops due to removal of melt and the protective layer formed is exposed to the furnace atmosphere, the protective layer persists if the temperatures of the furnace atmosphere remain below around 1050° C. Above this temperature, the protective layer and also the additives in the lining material decompose, wherein moreover the decomposition products at least weaken the refractory lining material. Thus, the corrosion protection is reduced and the material is eroded by corrosion.

In addition to anti-wetting agents, stable calcium aluminate phases such as CA, CA$_2$ and CA$_6$ improve corrosion resistance.

More and more, smelting furnaces are also being used that operate above the melt bath with more energy-efficient regenerative burners, wherein surface temperatures in the furnaces above 1450° C. occur. Because of that the additives and especially the protective coatings are decomposed, which are exposed to the hotter furnace bath atmosphere when the melting bath level is lowered. When the melting bath is filled, these zones, which no longer comprise a protective layer, come into contact with the melt, resulting in corrosion reactions between the melt and the refractory material of the lining.

Consequently, an anti-wetting agent is known from DE 10 2008 003 640 B4 which is free of calcium fluoride, does not decompose up to at least 1450° C. and comprises a) at least one fluoride from the group of the following fluorides: aluminum fluoride, barium fluoride, strontium fluoride, and b) a synthetically produced barium sulfate. This anti-wetting agent is also effective at higher temperatures.

It is also known, for example, from EP 2 550 243 B1, to add aluminum metaphosphate as a binder. The aluminum metaphosphate also acts as an anti-wetting agent at higher temperatures. EP 2 550 243 B1 discloses a refractory composition comprising a plurality of aggregated ceramic particles, a binder sintered to the plurality of aggregated ceramic particles, the binder comprising crystalline aluminum orthophosphate distributed in the binder as a result of the reaction of aluminum metaphosphate with alumina, and a nonfacile additive of calcium aluminate cement, sodium silicate, polyphosphate or organic salts.

It is therefore an objective of the present disclosure to provide a dry substance mixture for a batch, in particular a refractory concrete batch, for the production of a coarse ceramic refractory non-basic, shaped or unshaped product, wherein the product shall have good corrosion resistance and good infiltration resistance when wetted with liquid aluminum and liquid aluminum alloys.

It is a further objective of the present disclosure to provide such a refractory concrete batch.

A further objective of the present disclosure is to provide a product made from the batch and a method of producing the same.

Furthermore, the present disclosure relates to a lining of an industrial furnace for the primary or secondary aluminum industry, wherein the lining, preferably the working casing or wear casing of the lining, comprises at least one such product, and to such an industrial furnace.

Furthermore, the present disclosure relates to a lining of a launder transport system or a mobile transport vessel for the aluminum industry, and to such a launder transport system and such a transport vessel.

SUMMARY

The above-mentioned objectives are solved by a dry substance mixture comprising:
a) coarse- and fine-grained aggregate of at least one refractory, non-basic aggregate material with a grain size >200 µm, preferably in a total amount of 45 to 80 ma. %, preferably 50 to 60 ma. %, b) meal-grained aggregate of at least one refractory, non-basic aggregate with a grain size ≤200 µm, preferably in a total amount of 15 to 50 ma. %, preferably 25 to 40 ma. %, wherein the meal-grained aggregate comprise an $Al_2O_3$ granular material, c) at least one anti-corrosion agent to improve corrosion resistance to molten aluminum, and d) optionally at least one dry binder.

The anticorrosive agent comprises at least one first dry, mealy phosphate having a softening point, determined by heating microscopy according to DIN ISO 540:2008, of 600 to 1400° C., preferably 800 to 1300° C., and at least a second dry, mealy phosphate having a softening point, determined by heating microscopy according to DIN ISO 540:2008, of >1600° C., the two phosphates each having a solubility in water at 20° C. according to DIN EN 15216:2008-1 of <50 g/l, preferably <30 g/l, more preferably <20 g/l.

The at least one first phosphate is calcium dihydrogen phosphate ($Ca(H_2PO_4)_2$), magnesium dihydrogen phosphate ($Mg(H_2PO_4)_2$), calcium hydrogen phosphate ($CaHPO_4$) or magnesium hydrogen phosphate ($MgHPO_4$) or calcium hydrogen phosphate dihydrate ($CaHPO_4 \cdot 2\ H_2O$) or magnesium hydrogen phosphate trihydrate ($MgHPO_4 \cdot 3\ H_2O$), preferably calcium hydrogen phosphate ($CaHPO_4$), and the at least one second phosphate is aluminum phosphate ($AlPO_4$).

According to another aspect of the present disclosure, the above-mentioned objectives are further solved by a refractory concrete batch, comprising a dry substance mixture as previously described above and as further defined herein and in addition to the dry substance mixture at least one liquid binder in enclosed form.

According to another aspect of the present disclosure, a method for the production of a coarse ceramic, refractory, unfired, shaped or unshaped, non-basic product, in particular for a working casing or a backing of a large-volume industrial furnace of the aluminum industry, is provided, wherein the method comprises forming the product from a batch comprising a dry substance mixture as described above and as further defined herein.

According to another aspect of the present disclosure, a lining of an industrial furnace, of a stationary launder transport system, or of a mobile transport vessel, used in the primary or secondary aluminum industry, is provided, wherein the lining comprises at least one product, preferably a prefabricated component, which is produced from a batch comprising a dry substance mixture as described above and further defined herein.

According to another aspect of the present disclosure, an industrial furnace, preferably a smelting furnace or a casting furnace or a holding furnace, is provided, wherein the industrial furnace comprises a lining as described above and as further defined herein.

According to yet another aspect of the present disclosure, a launder transport system for use in the primary or secondary aluminum industry for transporting liquid aluminum or a liquid aluminum alloy is provided, wherein the launder transport system comprises a lining as described above and as further defined herein.

Finally, according to yet another aspect of the present disclosure, a mobile transport vessel for use in the primary or secondary aluminum industry for transporting liquid aluminum or a liquid aluminum alloy is provided, wherein the transport vessel comprises a lining as described above and as further defined herein.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, the present disclosure is explained in more detail by way of example with reference to the accompanying drawings, in which.

Figure 1:
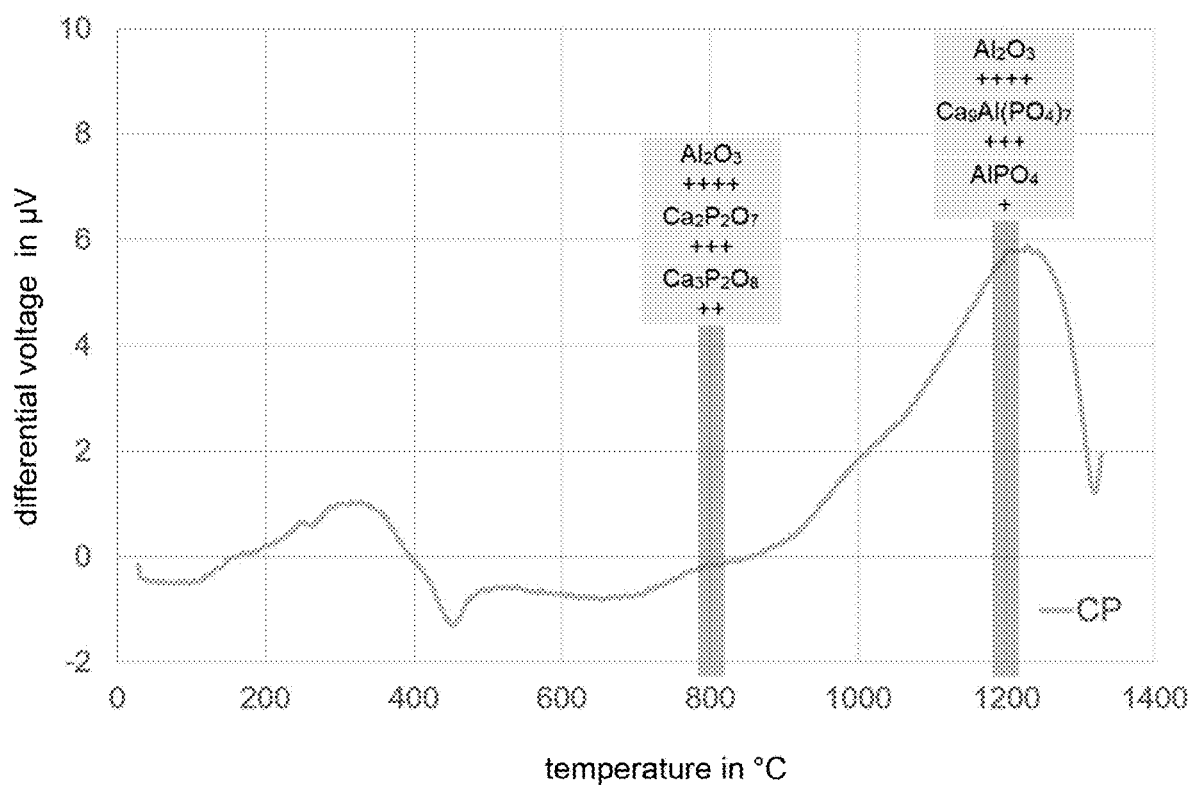
FIG. 1 shows a graph of differential voltage plotted as a function of temperature for temperature-dependent reactions in the $Ca(HPO_4)/Al_2O_3$ system.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

In general, the present disclosure provides a dry substance mixture, a refractory concrete batch, and a lining as described above and as further defined herein, as well as an industrial furnace, a launder transport system, and a mobile transport that incorporates said lining and a method of forming a product from the dry substance mixture.

Within the scope of the present disclosure, it was surprisingly found that excellent corrosion resistance can be achieved in case of wetting with liquid aluminum and aluminum alloys if the dry substance mixture according to the invention comprises at least a first dry, mealy phosphate with a softening point determined by heating microscopy according to DIN ISO 540:2008 of 600 to 1400° C., preferably 800 to 1300° C., and at least a second dry, mealy phosphate with a softening point determined by heating microscopy according to DIN ISO 540:2008 of >1500° C., preferably >1600° C., particularly preferably >1700° C., in combination with a mealy $Al_2O_3$ granular material.

The dry substance mixture according to the present disclosure thus has the following components:

a) coarse- and fine-grained aggregate of at least one refractory, non-basic, aggregate material with a grain size >200 µm, preferably in a total amount of 45 to 80 ma. %, preferably 50 to 60 ma. %, b) meal-grained aggregate of at least one refractory, non-basic, aggregate material with a grain size ≤200

μm, preferably in a total amount of 15 to 50 ma. %, preferably 25 to 40 ma. %, wherein the meal-grained aggregate has an $Al_2O_3$ granular material, c) optionally at least one binder in dry form, d) at least one anti-corrosion agent, in particular an anti-wetting agent, in the form of a first dry, mealy phosphate with a softening point according to DIN ISO 540:2008 of 600 to 1400, preferably 800 to 1300° C., and e) at least one anti-corrosion agent, in particular an anti-wetting agent, in the form of a second dry, mealy phosphate having a softening point according to DIN ISO 540:2008 of >1500° C., preferably >1600° C., particularly preferably >1700° C.

The refractory concrete batch according to the present disclosure has the dry substance mixture and, in addition to the dry substance mixture, at least one liquid binder in enclosed form.

Phosphates are the salts and esters of orthophosphoric acid ($H_3PO_4$). Phosphorus (P) is present in the oxidation state (V) in all these compounds. A further distinction is made between, among others, primary phosphates (dihydrogen phosphates), secondary phosphates (hydrogen phosphates) and tertiary phosphates.

Preferably, the first phosphate is a primary phosphate, preferably an alkaline earth dihydrogen phosphate, or a secondary phosphate, preferably an alkaline earth hydrogen phosphate. However, it may also be a tertiary phosphate.

In addition, although the first phosphate is preferably an orthophosphate, it may also be a metaphosphate.

Preferably, it is calcium dihydrogen phosphate (Ca($H_2PO_4$)$_2$), magnesium dihydrogen phosphate (Mg($H_2PO_4$)$_2$), calcium hydrogen phosphate ($CaHPO_4$) or magnesium hydrogen phosphate ($MgHPO_4$).

Also well suited for the present disclosure are calcium hydrogen phosphate as dihydrate ($CaHPO_4 \cdot 2 H_2O$) and magnesium hydrogen phosphate as trihydrate ($MgHPO_4 \cdot 3 H_2O$).

The second phosphate is preferably a tertiary phosphate, preferably aluminum phosphate ($AlPO_4$) or zirconium phosphate ($ZrP_2O_7$). Aluminum phosphate ($AlPO_4$) is particularly preferred.

According to another aspect of the present disclosure, the two phosphates are not soluble or only moderately soluble in water so as not to influence the pH value of the batch fresh mass produced from the batch according to the invention. According to the invention, the phosphates have a solubility in water at 20° C. according to DIN EN 15216:2008-1 of <50 g/l, preferably <30 g/l, particularly preferably <20 g/l.

Particularly preferably, the phosphates comprise a solubility in water at 20° C. according to DIN EN 15216:2008-1 of <1 g/l, preferably of <0.1 g/l. Such phosphates are particularly suitable for the present disclosure.

In general, the first phosphate is preferably a calcium phosphate that is not soluble in water or a magnesium phosphate that is not soluble in water or a calcium phosphate or a magnesium phosphate with the indicated low solubility, in particular with a solubility <1 g/L, preferably <0.1 g/L, and the softening point indicated for the first phosphate.

The calcium phosphate or magnesium phosphate may be anhydrous or hydrous, preferably it is anhydrous.

Particularly preferably, it is a secondary, anhydrous or hydrous, preferably anhydrous, calcium phosphate (=calcium hydrogen phosphate) or a secondary, anhydrous or hydrous, preferably anhydrous, magnesium phosphate (=magnesium hydrogen phosphate). In addition, the batch preferably has a total content of $P_2O_5$, based on the total dry mass of the batch, determined by X-ray fluorescence analysis according to DIN EN ISO 12677:2013-2, of 2 to 10 ma. %, preferably from 4 to 6 ma. %.

Preferably, the dry substance mixture has a total amount of 2 to 10 wt. %, preferably 4 to 7 ma. %, of first phosphate.

Preferably, moreover, the total amount of $P_2O_5$ in the dry substance mixture resulting from the at least one first phosphate, determined by means of X-ray fluorescence analysis in accordance with DIN EN ISO 12677:2013-2, is 1.0 to 6.0 ma. %, preferably 2.0 to 4.0 ma. %.

Preferably, the dry substance mixture also has a total amount of 2 to 10 ma. %, preferably 2 to 6 ma. %, of second phosphate.

Preferably, moreover, the total amount of $P_2O_5$ in the dry substance mixture resulting from the at least one second phosphate, determined by means of X-ray fluorescence analysis in accordance with DIN EN ISO 12677, is 1.0 to 6.0 ma. %, preferably from 1.2 to 3.0 ma. %.

Furthermore, the two phosphates preferably comprise a bulk density according to DIN ISO 697:1984-01 of 200 to 1400 g/l, preferably 400 to 900 g/l. The bulk density provides good processing behaviour.

In addition, the phosphates are preferably label-free (non-toxic/non-harmful to health).

The $Al_2O_3$ component or $Al_2O_3$ granular material consists of at least one raw material containing at least 40 ma. %, preferably at least 90 ma. %, particularly preferably at least 95 ma. %, aluminum oxide ($Al_2O_3$).

The $Al_2O_3$ component or $Al_2O_3$ granular material thus particularly preferably consists of alumina. However, it can also consist of an aluminosilicate or another raw material rich in alumina.

Preferably, the mealy $Al_2O_3$ granular material consists of alumina, preferably fused alumina, in particular white fused alumina, and/or calcined alumina, e.g. reactive alumina, and/or sintered alumina, particularly preferably tabular alumina, or sintered bauxite. However, it may also consist of spinel and/or mullite and/or fireclay, for example. The $Al_2O_3$ granular material can thus consist of one or more raw materials rich in alumina.

Preferably, the batch has a total amount of 15 to 50 ma. %, preferably 25 to 40 wt. %, of mealy $Al_2O_3$ granular material, based on the total dry mass of the batch.

Thereby, the mealy $Al_2O_3$ granular material preferably has a grain fraction with a grain size ≤100 μm, preferably a grain fraction with a grain size ≤30 μm.

Preferably, the amount of the grain fraction of the $Al_2O_3$ granular material with a grain size ≤100 μm in the dry substance mixture is 10 to 45 ma. %, preferably 20 to 35 ma. %.

Preferably, the amount of the grain fraction of the $Al_2O_3$ granular material with a grain size ≤30 μm in the dry substance mixture is 5 to 35 ma. %, preferably 10 to 20 ma. %.

According to another aspect of the present disclosure, the combination of the two phosphates with the mealy $Al_2O_3$ granular material provides a corrosion protection effect over a wide temperature range from 1000 to 1400° C.

Preferably, the mass ratio of the two phosphates: $Al_2O_3$ granular material is 1:2 to 1:6, preferably 1:3 to 1:5.

The first phosphate, in the presence of $Al_2O_3$ as reactant, forms new phases below 1050° C., which improve the corrosion resistance by the above described mechanisms above 1050° C. The less reactive second phosphate is more unreactive in this temperature range (no early softening of the microstructure) and only undergoes modification changes ($AlPO_4$: berlinite, cristobalite, tridymite) and densifies the microstructure at temperatures >1100° C.

In particular, phase transformations of the first phosphate with the $Al_2O_3$ grain, preferably the alumina, and/or the second phosphate, especially the $AlPO_4$, lead to the improvement. At even higher temperatures (above the softening point of the calcium aluminate phosphate phases), the second phosphate, in particular the $AlPO_4$, remains stable and additionally, due to the transformations and the increasing sintering/densification, increases the strengths. The two phosphates according to the invention thus complement one another depending on the temperature, alone, the properties would not be given for both. The first phosphate is reactive early, forms new phases and softens, while the second phosphate, in particular the $AlPO_4$, serves as a reactant, undergoes modification changes and solidifies the microstructure at high temperatures.

As explained above, the batch according to the invention also comprises refractory aggregate. The refractory, non-basic aggregate forms the raw material basis of the dry substance mixture and/or the refractory concrete batch in a manner known per se.

In a manner known per se, the refractory aggregate comprises at least one refractory, non-basic, aggregate material. In addition, the aggregate has a grain size distribution typical for the production of a coarse ceramic refractory product. That is, the aggregate thus comprises a grain size distribution such that the coarse aggregate grains in the manufactured product form a support structure grains embedded in the binder matrix in a manner known per se.

That is, the aggregate preferably has both a fine-grain proportion or fine-grain fraction and a coarse-grain proportion or coarse-grain fraction. In this regard, both the fine grain proportion and the coarse grain proportion preferably comprise a continuous grain size distribution. The fine grain proportion also has a meal-grain proportion or a meal-grain fraction.

In the context of the present disclosure, fine grain proportion refers to all granular materials ≤1 mm and >200 μm. Accordingly, the coarse grain proportion has grain sizes >1 mm. In the context of the invention, the term meal-grain proportion refers to all granular materials ≤200 μm.

Preferably, the coarse grain proportion is 40 to 60 ma. %, based on the total amount of aggregate.

Preferably, the aggregate also has a maximum grain size ≤15 mm, preferably ≤7 mm.

Preferably, the other aggregate materials of the aggregate also consist of raw materials rich in alumina, preferably with a content of at least 40 ma. % $Al_2O_3$, more preferably at least 80 ma. % $Al_2O_3$, very particularly preferably at least 90 ma. % $Al_2O_3$.

Thus, the refractory concrete batch according to the present disclosure preferably is an $Al_2O_3$—$SiO_2$ product.

And the products according to the present disclosure are preferably products of the $SiO_2$—$Al_2O_3$ series.

Preferably, the aggregate materials of the aggregate consist of alumina, preferably fused alumina, preferably white fused alumina, and/or calcined alumina, e.g. reactive alumina, and/or sintered alumina, preferably tabular alumina, and/or sintered bauxite. However, they may also consist, for example, of other raw materials rich in alumina, preferably spinel and/or mullite and/or fireclay.

Preferably, at least 80 ma. %, preferably 90 ma. %, preferably 100 ma. % of the aggregate consists of aggregate materials of alumina. This reduces the reaction potential with liquid aluminum and aluminum alloys.

Preferably, for this reason, the dry substance mixture also has an $Al_2O_3$ content of 60 to 92 ma. %, preferably 80 to 90 ma. %.

Consequently, the mealy $Al_2O_3$ granular material forms part of the mealy aggregate. And the total amount of mealy $Al_2O_3$ granular material is composed of the meal-grain proportion of all the aggregate materials consisting of a raw material rich in alumina with the minimum $Al_2O_3$ content mentioned above.

As already explained, the dry substance mixture also optionally has a dry binder, preferably in amounts of 0 to 20 ma. %, preferably 1 to 7 ma. %.

Dry binders are known to be present in granular form or as granular material. The dry binder is preferably a hydraulic binder, preferably calcium aluminate cement (CAC), and/or water glass and/or aluminum hydroxide binder and/or a geopolymer binder and/or a phosphate binder consisting of a water-soluble phosphate.

Unlike phosphate binders, the phosphates according to the invention, due to their at most moderate solubility, do not form a binding between room temperature and 800° C. They therefore do not shift the pH value of the mixture during mixing. No neutralization reactions with precipitation of new phases take place.

Calcium aluminate cement is particularly preferred for unshaped products, as it ensures good workability and controlled setting behavior. In particular, calcium aluminate cement provides good strength after 24 h after setting at room temperature.

As described above, the refractory concrete batch according to the invention also has at least one liquid binder in addition to the dry substance mixture, preferably in an amount of 4 to 12 ma. %, preferably 6 to 10 ma. %, based on the dry mass of the dry substance mixture. In addition thus means that the amount of liquid, enclosed binder is based on the dry mass of the dry substance mixture (see exemplary embodiments).

The liquid binder is preferably silica sol and/or alumina sol and/or an organic binder and/or a phosphate binder. Particularly preferably silica sol is used.

The liquid binders are enclosed in a container separate from the dry components of the batch.

The batch also preferably has a total binder content (active ingredient content) of 1 to 30 ma. %, preferably 1 to 15 ma. %, based on the total dry mass of the batch. In the case of the liquid binder, of course, only the active ingredient content is included if it is a suspension or the like.

The total dry mass of the batch or of the fresh batch mass produced therefrom is thus obtained from the sum of the dry batch components (=dry mass of the dry substance mixture) and, if applicable, the active ingredient content of the liquid batch components.

The batch according to one aspect of the present disclosure, in particular the dry substance mixture, may also contain at least one further additive (in addition to the two phosphates according to the invention). Additives improve, for example, the workability or formability or the corrosion resistance or modify the microstructure. The additives can be contained in the batch in mealy, dry form or, in addition to the dry substance mixture, in liquid form (enclosed). The maximum amount of additional additive(s) (active ingredient content) in the batch according to the invention, based on the dry mass of the batch, is preferably <10 ma. %, preferably <6 ma. %.

Preferably, the batch according to the invention, in particular the dry substance mixture, comprises at least one liquefier as an additive, in particular if the batch is a liquefied refractory concrete batch.

Furthermore, the batch according to another aspect of the present disclosure, in particular the dry substance mixture, preferably comprises at least one further, phosphate-free, anti-corrosion agent as an additive. Preferably, the batch comprises barium sulfate and/or a fluoride-containing anti-corrosion agent, preferably calcium fluoride and/or strontium fluoride and/or aluminum fluoride.

In addition to the aforementioned anti-wetting agents, at least one anti-corrosion agent from a stable calcium aluminate phase, such as CA, $CA_2$ or $CA_6$, may be contained.

In addition, the batch, in particular the dry substance mixture, may comprise at least one activator for the binder as an additive. For example, this may be mealy magnesia and/or a sulfate and/or powdered water glass. The activators serve in particular to shift the pH value.

The dry substance mixture may also contain fibers, in particular burn-out fibers, as an additive. Preferably, these are plastic fibers, preferably polypropylene fibers. The total amount of fibers in the dry substance mixture is thereby preferably <1 ma. %, preferably <0.5 ma. %. After burning out, channels are formed through which water vapor can escape in a manner known per se. The fibers thus provide a heating aid.

As already explained, shaped or unshaped products are produced from the coarse ceramic batch according to the invention in a manner known per se.

For the production of unshaped products, in particular of masses, preferably gunning masses or vibrating masses or casting masses or poking masses, a fresh batch mass is prepared from the dry and liquid components of the refractory batch. Since the batch contains a liquid binder, the addition of water is not necessary, but possible.

The fresh batch mass is processed in a manner known per se, e.g. by gunning or, particularly preferably, by casting.

The shaped products according to the invention are prefabricated components. In the production of the prefabricated components, the fresh batch mass prepared as described above is placed in a mold and, if applicable, compacted so that molded bodies are formed. If the batch contains a liquid binder and/or a liquid additive, the addition of water is not necessary, but possible. Thus, if applicable, only water is added, especially if a dry binder is contained in the dry substance mixture. In contrast to the production of the unshaped products from the refractory concrete batch according to the invention, the liquid batch components also do not have to be present in an enclosed form.

If applicable, depending on the binder used, drying is carried out after shaping, e.g. between 6° and 500° C., in particular between 9° and 450° C. Drying is preferably carried out to a residual moisture content of between 0.1 and 4 ma. %, in particular between 0.5 and 3 ma. %, determined in accordance with DIN 51078:2002-12.

The prefabricated components according to the invention, in particular the bricks, are used unfired or tempered.

Both the shaped prefabricated components as well as the unshaped products comprise excellent mechanical properties. Unless otherwise explained, the values given below are based on a standardized test of the products according to DIN EN ISO 1927-6:2013-04 after a standardized production of the test specimens with a heat treatment at 1100° C. according to DIN EN ISO 1927-5:2013-04:

The products according to the invention comprise a very good cold compressive strength according to DIN EN ISO 1927-6:2013-04 preferably of 50 to 90 MPa, in particular 60 to 75 MPa.

The cold bending strength according to DIN EN ISO 1927-6:2013-043 of the products according to the invention, is preferably 12 to 20 MPa, in particular from 15 to 18 MPa.

The products according to the present disclosure also preferably have an open porosity of 13 to 22 vol. %, especially 17 to 21 vol. %, determined according to DIN EN ISO 1927-6:2013-04. And/or they preferably comprise a raw density of 2.50 to 3.00 g/cm$^3$, in particular of 2.8 to 2.95 g/cm$^3$, determined according to DIN EN ISO 1927-6:2013-04.

The products according to the present disclosure also preferably have a modulus of elasticity of 50 to 80 GPa, in particular of 60 to 70 GPa, determined in accordance with DIN EN ISO 1927-6:2013-04.

All the aforementioned properties of the products according to the present disclosure and of the batch according to the invention are in each case individually and in any combination according to the invention. In addition, the respective upper and lower limits of the individual range specifications can all be combined with each other according to the invention.

In order to prove the mode of operation of the two phosphates according to the present disclosure in combination with the $Al_2O_3$ granular material, some comparative tests were carried out within the scope of the present disclosure. The following raw materials were used for the comparative tests:

TABLE 1

| Raw materials used | |
|---|---|
| Tabular alumina (all grain groups) | Tabular Alumina T60 Almatis Co. |
| White fused alumina 0-0.2 mm | White Fused Alumina 0-0.2 Bosai Co. |
| Calcined alumina | CT 9 G Almatis Co., $d_{99}$ value = 63 μm |
| Second phosphate ($AlPO_4$) | M 13-02 Budenheim Co. |
| First phosphate ($Ca(HPO_4)$) | C 22-03 Budenheim Co., $d_{50}$ value = 12 μm |
| Liquefier | Castament FS 20 BASF Co. |
| PP fibre | polypropylene cut, 20 μm, 6 mm Contrack Co. |
| Silica sol | LIQUIDBINDER NO. 1 CWK Co. |

Among other things, comparative tests were carried out with the first phosphate and with the second phosphate, in combination with the calcined alumina respectively. The first phosphate and the calcined alumina were mixed together in a ratio of 1:3. The second phosphate and the calcined alumina were also mixed together in a ratio of 1:3. The mixtures respectively were subjected to temperatures of 800° C. and 1200° C. in a crucible. In addition, differential thermal analysis and X-ray diffraction analysis of the initial mixtures and the fired mixtures were carried out.

Figure 2:
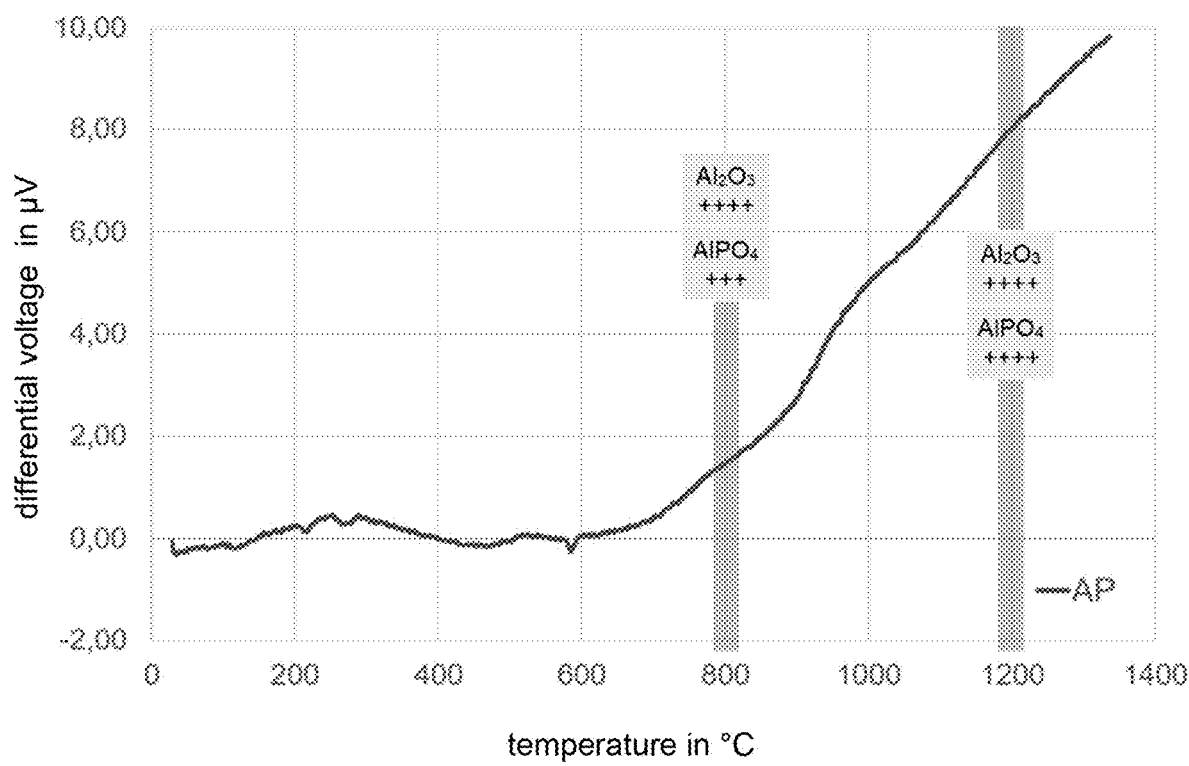
FIG. 2: shows a graph of differential voltage plotted as a function of temperature for temperature-dependent reactions in the system $AlPO_4/Al_2O_3$.

The result of the measurements are shown in FIGS. 1 and 2.

Among other things, it was found that the first phosphate initially starts to dehydrate at about 400° C. (FIG. 1). At 800° C., the Ca phosphate is present as dicalcium phosphate $Ca_2(P_2O_7)$, but already begins to react with the calcined alumina to form calcium aluminum phosphate $Ca_9Al(PO_4)_7$. At 1200° C. the reaction to calcium aluminum phosphate $Ca_9Al(PO_4)_7$ is complete.

The second phosphate (FIG. 2) undergoes only modification changes analogous to $SiO_2$. At 800° C., both the quartz structure (berlinite) as well as the tridymite and cristobalite structures are present. At 1200° C., the aluminum phosphate ($AlPO_4$) almost is only present in the cristobalite structure. The total amount of aluminum phosphate ($AlPO_4$) appears to remain about the same. The calcined alumina does not undergo any significant changes (participates in the phosphate transformation, if applicable).

Thus, mainly the formation of calcium aluminate phosphate from dicalcium phosphate occurs in the presence of mealy $Al_2O_3$ at temperatures from 800 to 1000° C. At 1000° C., dicalcium phosphate phases are no longer detectable, the calcium aluminate phosphate phases are stable up to at least 1200° C. and serve to improve corrosion resistance. On the one hand, the $AlPO_4$ serves as a reaction partner, yet it mainly undergoes modification changes. At 800° C. it is present in the berlinite, tridymite and cristobalite modification, at 1000° C. and 1200° C. still in the tridymite and cristobalite modification. These reactions lead to an increase in strength and a decrease in open porosity after prefire at 1200° C., this was also confirmed by an experiment with $AlPO_4$ in a typical system without further phosphates (see below). At lower temperatures it shows no significant effect, one reason for the combination with the first phosphate.

Furthermore, the subsequent batch was used to investigate the densifying effect of pure aluminum phosphate ($AlPO_4$):

Table 2: Batch composition for the determination of physical properties (grain groups)

TABLE 2

| Batch composition for the determination of physical properties (grain groups) | | |
|---|---|---|
| | | amount [ma.-%] |
| Tabular alumina | 2-5 mm | 25.00 |
| | 1-3 mm | 20.00 |
| | 0-1 mm | 20.00 |
| White fused alumina | 0-0.02 mm | 10.00 |
| Alumina | | 22.00 |
| Second phosphate ($AlPO_4$) | | 3.00 |
| Liquefier | | 0.10 |
| PP fibre | | 0.05 |
| | | Σ 100 |
| Silica sol | | 7.5 (based on dry substance mixture) |

The determination of cold flexural strength (CFS) and open porosity (OP) on the above mentioned batch was carried out after pre-firing at 1200° C. according to the respective standards mentioned above. The test specimens were also manufactured in accordance with the standard DIN EN ISO 1927-5:2013-04.

TABLE 3

| Results of the determination of the physical properties | |
|---|---|
| CFS in MPa | Open porosity in vol. % |
| 18.00 | 17.00 |

In addition, further comparative tests were carried out with regard to corrosion resistance to molten aluminum.

For this purpose, crucibles were made from a batch with the following batch composition:

TABLE 4

| batch composition (grain groups) for the crucible tests | | |
|---|---|---|
| | | amount [ma. %] |
| Tabular alumina | 2-5 mm | 25.00 |
| | 1-3 mm | 20.00 |
| | 0-1 mm | 20.00 |
| White fused alumina | 0-0.2 mm | 10.00 |
| Calcined alumina | | 16.85 |
| $AlPO_4$ | | 3.00 |
| $Ca(HPO_4)$ | | 5.00 |
| Liqufier | | 0.10 |
| PP fiber | | 0.05 |
| | | Σ100 |
| Silica sol | | 7.50 |

The crucibles were manufactured in accordance with the above standard and prefired at the respective test temperature with a holding time of 5 h.

Figure 3:
FIG. 3: shows a cross-section of a s crucible exposed to liquid aluminum at 1000° C./150 h.
Figure 4:
FIG. 4: shows a cross-section of a s crucible exposed to liquid aluminum at 1200° C./150 h.

It was found that a dense passivation or protective layer (FIG. 3) was formed in case of the crucibles exposed to 1000° C. This passivation layer also persisted in case of the crucibles exposed to 1200° C. (FIG. 4). No further infiltration took place.

In addition, further tests were carried out with three different batches V1 to V3 to document the change in softening behavior. The specimens were again manufactured according to DIN EN ISO 1927-5:2013-04, and the softening range was determined according to DIN EN ISO 1893:2008-09. A table of the batch compositions and a table with the determined softening ranges are shown below:

TABLE 5

| batch composition for tests V1 to V3 | | | | |
|---|---|---|---|---|
| Raw material | amount | V1 | V2 | V3 |
| Alumina | [ma. %] | 69.23 | 78.95 | 58.44 |
| First phopsphate | [ma. %] | 30.77 | 0.00 | 25.97 |
| Second phosphate | [ma. %] | 0.00 | 21.05 | 15.58 |
| Silica sol (liquid) | [ma. %] | 51.08 | 58.25 | 43.12 |

TABLE 6

| softening ranges for tests V1 to V3 | |
|---|---|
| sample | softening range |
| V1 | 1080° C. . . . 1247° C. |
| V2 | >1546° C. |
| V3 | 1166° C. . . . 1342° C. |

The results demonstrate that batch V1, which only contains pure calcium hydrogen phosphate, softens earlier and the phosphate combination according to the invention ensures a higher softening point.

The invention is not limited to the exemplary embodiments shown and described, but rather also comprises all embodiments which work the same way in the sense of the invention. It is emphasized that the exemplary embodiments are not limited to all features in combination, rather each individual partial feature can also have inventive significance in isolation from all other partial features. Furthermore, the invention is so far not yet limited to the combinations of features defined in any embodiment, but rather can also be defined by any other combination of specific features of all of the individual features disclosed. This means that in principle practically any individual feature of an embodiment can be removed or replaced by another individual feature disclosed elsewhere in the application. In other words, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A dry substance mixture for a batch batch for the production of a coarse ceramic, refractory, unfired, shaped or unshaped, non-basic product, the dry substance mixture comprising:
    a) coarse- and fine-grained aggregate including a coarse-grain fraction and a fine-grain fraction of at least one refractory, non-basic aggregate material, the coarse-grain fraction and the fine-grain fraction having a grain size >200 µm,
    b) meal-grained aggregate of at least one refractory, non-basic aggregate with a grain size ≤200 µm, wherein the meal-grained aggregate comprise an $Al_2O_3$ granular material, and
    c) at least one anti-corrosion agent to improve corrosion resistance to molten aluminum,
    wherein the anticorrosive agent comprises at least one first dry, meal-grained phosphate having a softening point, determined by heating microscopy according to DIN ISO 540:2008, of 600 to 1400° C., and at least a second dry, meal-grained phosphate having a softening point, determined by heating microscopy according to DIN ISO 540:2008, of >1600° C., the two phosphates each having a solubility in water at 20° C. according to DIN EN 15216:2008-1 of <50 g/l, and
    wherein the at least one first phosphate is calcium dihydrogen phosphate ($Ca(H_2PO_4)_2$), magnesium dihydrogen phosphate ($Mg(H_2PO_4)_2$), calcium hydrogen phosphate ($CaHPO_4$) or magnesium hydrogen phosphate ($MgHPO_4$) or calcium hydrogen phosphate dihydrate ($CaHPO_4 \cdot 2\ H_2O$) or magnesium hydrogen phosphate trihydrate ($MgHPO_4 \cdot 3\ H_2O$), and
    wherein the at least one second phosphate is aluminum phosphate ($AlPO_4$).

2. The dry substance mixture according to claim 1, wherein the at least one first phosphate has a solubility in water at 20° C. according to DIN EN 15216:2008-1 of <1 g/l.

3. The dry substance mixture according to claim 1, wherein the at least one first phosphate is not soluble in water.

4. Dry substance mixture according to claim 1, wherein the at least one first phosphate is a secondary calcium phosphate or magnesium phosphate and/or a primary calcium phosphate or magnesium phosphate.

5. The dry substance mixture according to claim 1, wherein the meal-grained $Al_2O_3$ granular material has a grain fraction with a grain size ≤100 µm.

6. The dry material substance according to claim 5, wherein the amount of the grain fraction of the $Al_2O_3$ granular material with a grain size ≤100 µm in the dry substance mixture is 10 to 45 ma. %, or the amount of the grain fraction of the $Al_2O_3$ granular material with a grain size ≤30 µm in the dry substance mixture is 5 to 35 ma. %.

7. The dry material mixture according to claim 1, wherein the dry substance mixture has a total amount of first phosphate of 2 to 10 ma. % or the dry substance mixture has a total amount of second phosphate of 2 to 10 ma. %.

8. The dry substance mixture according to claim 1, wherein the dry substance mixture comprises a total amount of $P_2O_5$, determined by means of X-ray fluorescence analysis in accordance with DIN EN ISO 12677:2013-2, resulting from the at least one first phosphate of 1.0 to 6.0 ma. % or resulting from the at least one second phosphate of 1.0 to 6.0 ma. %.

9. The dry substance mixture according to claim 1, wherein the first and second phosphates have a bulk density according to DIN ISO 697:1984-01 of from 200 to 1400 g/l.

10. The dry substance mixture according to claim 1, wherein one or more of the following exists:
    the $Al_2O_3$ granular material consists of at least one raw material rich in alumina with an $Al_2O_3$ content of ≥40 ma. %; and/or
    the $Al_2O_3$ granular material consists of alumina; and/or
    the dry substance mixture has a total amount of 15 to 50 ma. % of meal-grained $Al_2O_3$ granular material.

11. The dry substance mixture according to claim 1, characterized in that the fine-grain fraction of the coarse- and fine-grained aggregate has a grain size ≤1 mm and >200 µm and the coarse-grain fraction of the coarse- and fine-grained aggregate has a grain size >1 mm.

12. The dry substance mixture according to claim 1, wherein the aggregate consists of at least 40 ma. % of aggregate materials of alumina and/or aluminosilicates.

13. The dry substance mixture according to claim 1, wherein the dry binder is a hydraulic binder and/or water glass and/or an aluminum hydroxide binder and/or a geopolymer binder and/or a phosphate binder.

14. The dry substance mixture according to claim 1, wherein the dry substance mixture further comprises at least one liquefier and/or a further, phosphate-free, anti-corrosion agent.

15. The dry substance mixture according to claim 1, wherein the at least one first phosphate has a solubility in water at 20° C. according to DIN EN 15216:2008-1 of <0.1 g/l.

16. The dry substance mixture according to claim 1, wherein the meal-grained $Al_2O_3$ granular material has a grain fraction with a grain size ≤30 µm.

17. A refractory concrete batch for the production of a coarse ceramic, refractory, unfired, shaped or unshaped, non-basic product, the refractory concrete batch comprising:
    a) a dry substance mixture according to claim 1, and
    b) in addition to the dry substance mixture at least one liquid binder in enclosed form.

18. The refractory concrete batch according to claim 17, wherein the batch has a total content of $P_2O_5$, determined by X-ray fluorescence analysis in accordance with DIN EN ISO 12677:2013-2, of 2 to 10 ma. %, based on the total dry mass of the batch.

19. The refractory concrete batch according to claim 17, wherein the batch is a liquefied refractory concrete batch and/or the liquid binder is a silica sol and/or an alumina sol and/or an organic binder and/or a phosphate binder.

20. A method for the production of a coarse ceramic, refractory, unfired, shaped or unshaped, non-basic product, wherein the method comprises forming the product from a batch comprising a dry substance mixture according to claim 1.

21. The method according to claim 20, wherein a product for a working casing or a backing of a large-volume industrial furnace of the aluminum industry, is produced.

22. A lining of an industrial furnace or of a stationary launder transport system or a mobile transport vessel for transporting liquid aluminum or a liquid aluminum alloy, used in the primary or secondary aluminum industry, wherein the lining comprises at least one refractory product, which is produced from a batch comprising a dry substance mixture according to claim 1.

23. The lining according to claim 22, wherein the lining comprises a working casing and/or an insulating backing comprising the at least one refractory product.

24. The lining according to claim 23, wherein the working casing is installed in a single-layer or multi-layer masonry and/or the lining is arranged in a bath region, in a region of a ramp or in a burner field of the industrial furnace.

25. The lining according to claim 22, wherein the lining is a lining of a smelting furnace or casting furnace or holding furnace.

26. An industrial furnace for the primary or secondary aluminum industry, wherein the industrial furnace comprises a lining according to claim 22.

27. The industrial furnace according to claim 26, wherein the industrial furnace is a smelting furnace or casting furnace or holding furnace.

28. The industrial furnace according to claim 27, wherein the smelting furnace is a drum melting furnace, a shaft smelting furnace, an induction furnace, or a two- or multi-chamber furnace.

29. A stationary launder transport system for the primary or secondary aluminum industry for transporting liquid aluminum or a liquid aluminum alloy, wherein the launder transport system comprises a lining according to claim 22.

30. A mobile transport vessel for the primary or secondary aluminum industry for transporting liquid aluminum or a liquid aluminum alloy, wherein the transport vessel comprises a lining according to claim 22.

* * * * *